United States Patent [19]

Lin

[11] Patent Number: 6,012,729

[45] Date of Patent: Jan. 11, 2000

[54] LUGGAGE SYSTEM AND FOLDING DOLLY THEREFOR

[76] Inventor: Shiou Chang Lin, 207 S. Second Ave., Arcadia, Calif. 91006

[21] Appl. No.: 08/846,533

[22] Filed: Apr. 29, 1997

Related U.S. Application Data

[63] Continuation-in-part of application No. 08/582,921, Jan. 4, 1996, Pat. No. 5,797,617.

[51] Int. Cl.[7] .......................................................... B62B 1/04
[52] U.S. Cl. .......................... 280/47.18; 280/37; 280/654
[58] Field of Search .............................. 280/47.24, 47.17, 280/47.27, 47.29, 37, 47.315, 639, 655, 645, 654, 651, 652, 655.1, 47.28; 190/18 R, 18 A

[56] References Cited

U.S. PATENT DOCUMENTS

| | | |
|---|---|---|
| 957,406 | 5/1910 | Bjorklund . |
| 4,221,402 | 9/1980 | Kazmark . |
| 4,523,773 | 6/1985 | Holtz . |
| 5,024,455 | 6/1991 | Schrecongost ............................. 280/37 |
| 5,024,458 | 6/1991 | Kazmark et al. . |
| 5,323,886 | 6/1994 | Chen ...................................... 190/18 A |
| 5,326,116 | 7/1994 | Flax .................................... 280/47.371 |
| 5,368,143 | 11/1994 | Pond et al. . |
| 5,374,073 | 12/1994 | Hung-Hsin . |
| 5,385,220 | 1/1995 | Pond et al. . |
| 5,421,605 | 6/1995 | Chen . |
| 5,431,524 | 7/1995 | Marchwiak ............................. 280/655 |
| 5,452,778 | 9/1995 | Wang . |
| 5,549,318 | 8/1996 | Ho . |
| 5,749,503 | 5/1998 | Wulf et al. ............................... 224/153 |

*Primary Examiner*—Lanna Mai
*Assistant Examiner*—Bridget Avery
*Attorney, Agent, or Firm*—Sheldon & Mak

[57] ABSTRACT

A luggage system has a dolly connector unit on each of a plurality of luggage pieces; and a dolly including a wheeled base; a handle frame including a parallel spaced pair of telescoping columns projecting from the base, a handle member being rigidly connected between the columns for manipulation of the dolly; a platform pivotally connected to the base on a platform axis proximate the handle frame and having an extended position perpendicular the handle frame and a retracted position against the handle frame, a support for contacting the roadway surface in the extended position of the platform for providing a rest position of the dolly wherein the platform is fixed parallel to the roadway surface with the wheels also contacting the roadway surface, the dolly also having a luggage connector unit supported on the handle frame for coupling the dolly connector units, at least one luggage piece being supportable partly on the platform and partly by the handle frame when the luggage connector unit is coupled to the corresponding dolly connector unit. Counterparts of the luggage connector can be located on the base, corresponding bottom dolly connectors being on a side face proximate a bottom face of the luggage pieces. Each bottom dolly connector can have a cavity portion for receiving a hook portion of a base luggage connector, thereby to register the luggage piece on the dolly.

20 Claims, 4 Drawing Sheets

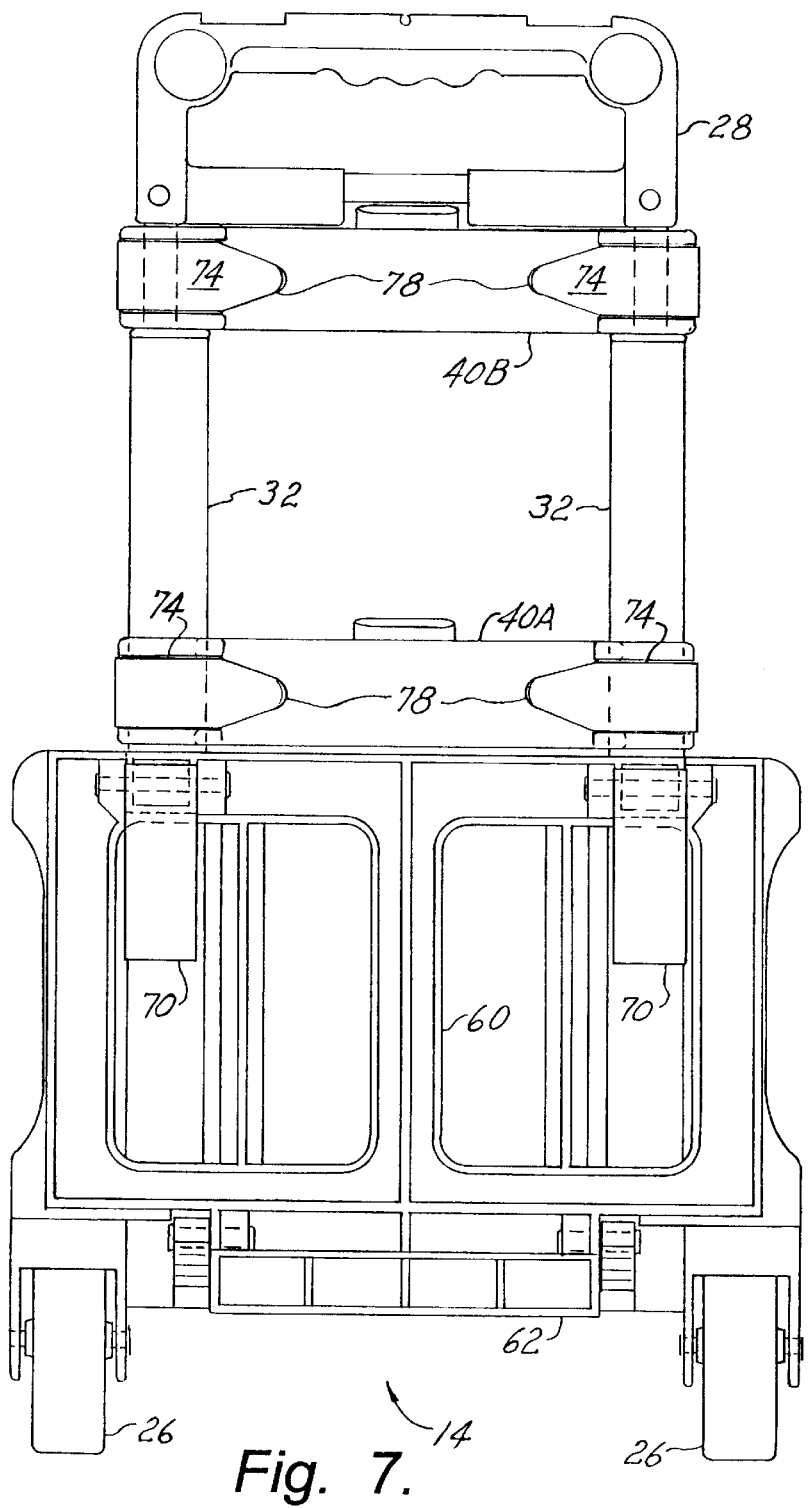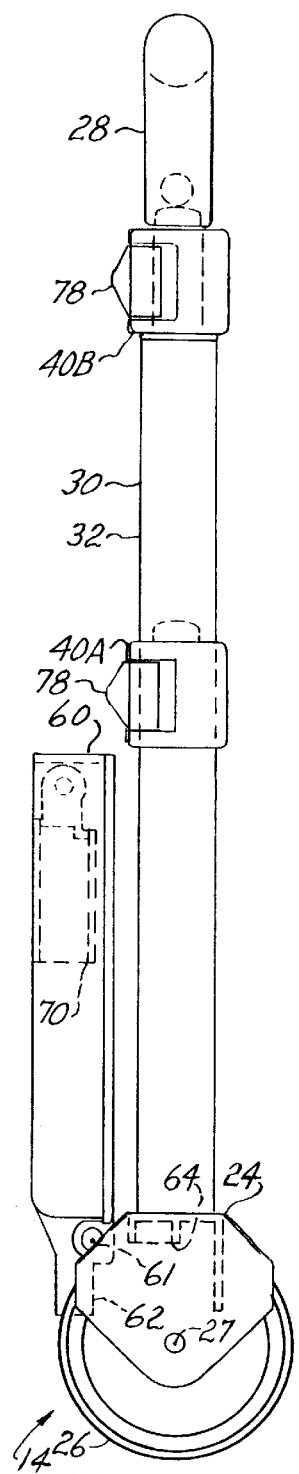

LUGGAGE SYSTEM AND FOLDING DOLLY THEREFOR

RELATED APPLICATION

This is a continuation-in-part of Application Ser. No. 08/582,921 that was filed on Jan. 4, 1996, now U.S. Pat. No. 5,797,617, which is incorporated herein by this reference.

BACKGROUND

The present invention relates to containers such as for luggage and the like, and to wheel devices for transporting same.

Dollies and other vehicles for transporting luggage and the like are commonly known, both for single and multiple articles of luggage. The problems associated with such devices include the luggage being subject to inadvertent falling or other undesired separation from the devices and, when the luggage is intentionally separated, the devices are awkward to store. It is also known to provide luggage with wheels permanently installed, and a tethered handle for pulling the luggage along without having to stoop over. However, the addition of wheels to each article of luggage is undesirably expensive and wasteful of space. Also, the wheels are typically made small in mitigation of the wasted space; consequently, the wheels are ineffective for traversing many commonly encountered obstacles. Further, the luggage is particularly subject to tipping over when pulled along by the tethered handle, especially when the luggage is tall and the wheels are small and/or closely spaced. Moreover, each such article is required to be pulled separately, the transport of several such articles of luggage being especially cumbersome.

Thus there is a need for luggage that is transportable on wheels, but without the disadvantages of the prior art.

SUMMARY

The present invention meets this need by providing a luggage system that includes a dolly removably connectable thereto. In one aspect of the invention, a luggage system includes a luggage piece having side and bottom faces and a bottom dolly connector unit fixably located on the side face proximate the bottom face, and a dolly having movable base, a platform fixably located relative to the base, a handle member fixably locatable relative to the base, and a base connector unit supported relative to the base, the base connector unit being selectively engagable with the bottom dolly connector unit for securing the luggage piece relative to the platform for transport thereon. As used herein, "luggage piece" is inclusive of a reusable hand-carryable container for transporting goods.

The bottom dolly connector unit can include a cavity portion having a bottom opening, the base luggage connector unit having an upwardly projecting hook portion for engaging the cavity portion of the bottom dolly connector unit. The base luggage connector unit can include a movable latch member, the bottom dolly connector unit being formed having a catch surface for engagement by the latch member whereby the luggage piece is rigidly retained on the dolly.

The luggage piece can further include an elevated dolly connector unit located in spaced relation above the bottom dolly connector unit having a rigid latch plate member having a latch plate opening therein on the side face and spaced above the bottom dolly connector, the dolly further including an elevated luggage connector unit including a latch member that is insertable into the latch plate opening during coupling of the elevated connector units. The elevated luggage connector unit can include a latch frame member connected to the base in spaced relation between the platform and the handle member, the elevated latch member being connected to the latch frame member and movable between open and closed positions relative to the latch frame member, the elevated latch member in the open position being insertable into the latch plate opening during coupling of the connector units, the latch member having a hook portion for holding the latch plate member proximate the latch frame member in the closed position of the latch member. The latch member can be one of an oppositely disposed pair of latch members, the system further including a registration boss fixedly located on one of the elevated connector units, the other of the elevated connector units having a registration opening formed therein for engagement by the registration boss, for guiding the latch members into engagement with the latch plate. The luggage latch unit can further include a latch actuator member movably supported by the latch frame member for simultaneous movement of the elevated latch members between the open and closed positions thereof, and a biasing element for biasing the elevated latch members toward the closed positions thereof.

The dolly can also include a pair of axially spaced wheels rotatably mounted to the base for rolling the dolly over a roadway surface, a handle frame connected between the base and the handle and supporting the luggage connector, and a support member for (together with the wheels) supporting the base with the dolly in a rest position, the platform being fixed parallel to the roadway surface, the handle frame extending perpendicular to the platform, the dolly also having a transport position wherein the platform and the handle frame are together inclined relative to the rest position, the support member being raised from the roadway surface with the wheels rollably supporting the dolly, the luggage piece being supportable partly on the platform and partly by the handle frame when the connector units are coupled together.

Preferably the platform is pivotally connected to the base proximate the handle frame for facilitating transport and storage of the dolly apart from luggage pieces, the platform being movable between an extended position perpendicular to the handle frame and a retracted position approximately parallel to the handle frame, the support member being connected to the platform in spaced relation to the handle frame, the platform being in the extended position in the rest and transport positions of the dolly. The luggage piece can further include an elevated dolly connector unit located in spaced relation above the bottom dolly connector, the dolly further including an elevated luggage connector unit. Preferably the handle frame includes a plurality of telescoping members for selectively locating the handle between an extended position and a retracted position relative to the base, the telescoping members forming a parallel spaced pair of frame columns, the elevated luggage connector being connected between corresponding members of each column. The elevated luggage connector unit can be a first elevated luggage connector connected between first column members of the handle frame, the dolly preferably also having a second elevated luggage connector connected between respective second column members of each column. The luggage piece can be a first luggage piece, the system further including a second luggage piece having a counterpart of the elevated dolly connector unit of the first luggage piece, the luggage pieces being stackable on the platform with respective ones of the elevated dolly connector units releasably engaging the first and second elevated luggage connectors.

The luggage piece can be a selected one of a plurality of luggage pieces, at least some of the pieces having the elevated dolly connector differently spaced from the bottom face, the elevated luggage connector being adjustably locatable relative to the platform for alignment with the elevated dolly connector of the selected luggage piece. Preferably the system includes a latch holder for yieldably holding the luggage connector on at least one of the column members.

In another aspect, the invention provides a dolly for use with luggage pieces, each luggage piece having a bottom dolly connector fixably located on a face surface proximate a bottom surface thereof, the bottom dolly connector having a cavity portion. In a further aspect, the invention provides luggage pieces having dolly connector units for use with the dollies.

DRAWINGS

These and other features, aspects, and advantages of the present invention will become better understood with reference to the following description, appended claims, and accompanying drawings, where:

FIG. 6 is a side elevational view showing a dolly portion of the system of FIG. 1 in a folded condition;

FIG. 7 is a rear elevational view of the dolly of FIG. 5;

DESCRIPTION

Figures 1, 2:
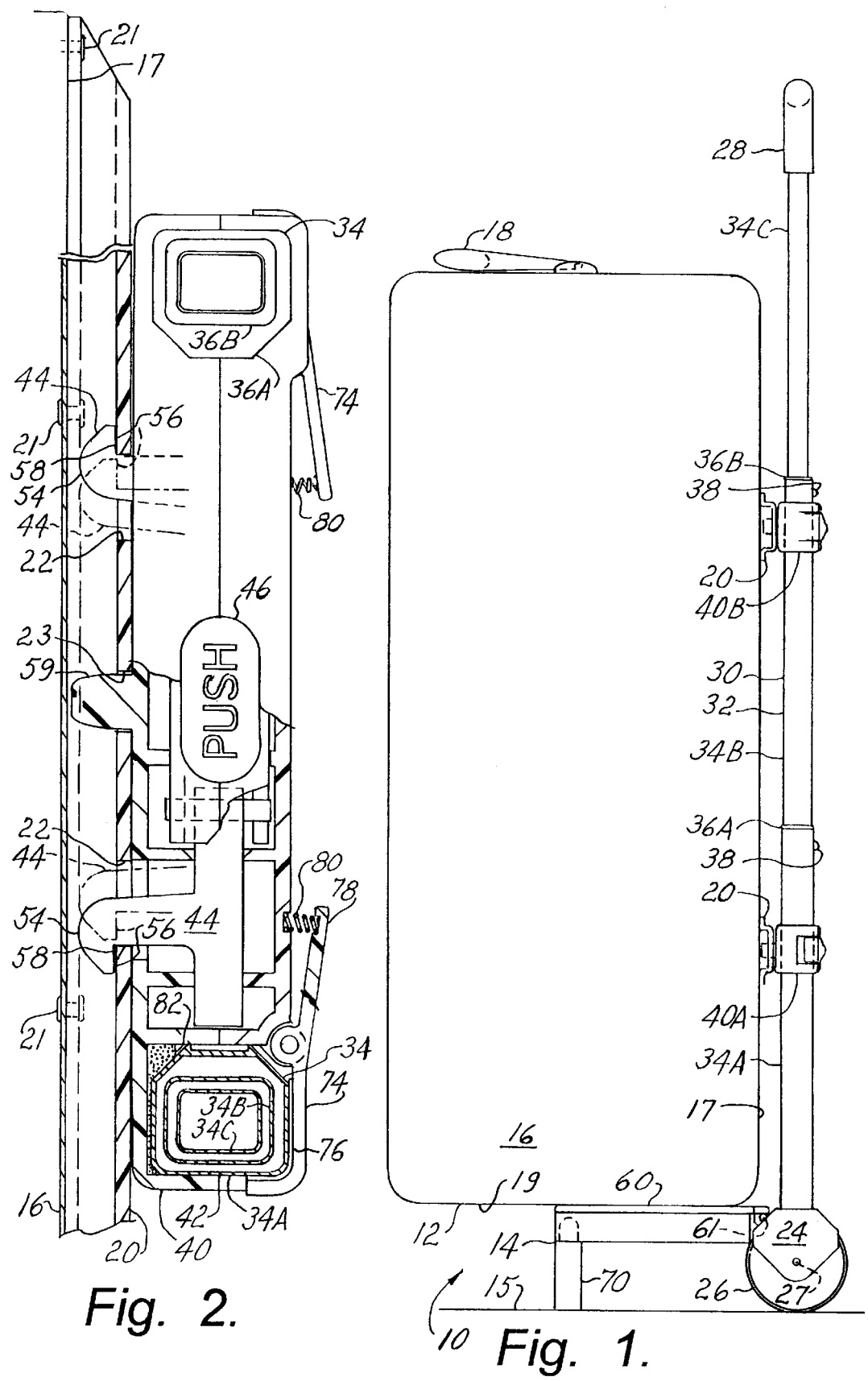
FIG. 1 is a side elevational view of a luggage system including a luggage article and a wheeled dolly connected thereto according to the present invention, the dolly being in a rest position.
FIG. 2 is a fragmentary sectional plan view of a portion of the system of FIG. 1.

The present invention is directed to a luggage system that facilitates secure wheeled transport of luggage while conserving space. With reference to FIGS. 1–5 of the drawings, a luggage system 10 has a luggage piece 12 (which is typically one of a plurality of such pieces that can be variously sized and configured) and a dolly 14 that is adapted for transporting the luggage piece 12 over a roadway surface 15 with the piece 12 being latched in place according to the present invention. The luggage piece 12 includes a container 16 which can be of conventional construction, typically including a luggage handle 18 as shown in FIG. 1. In an exemplary configuration of the system 10, a latch channel member 20 having a hat-shaped cross section is fixedly attached to a side face 17 of the container 16 by suitable fasteners 21. A pair of latch plate openings 22 are formed in a web portion of the channel member 20 in spaced relation to the container 16, the channel member 20 being releasably connectable to the dolly 14 and forming a dolly connector unit as described below for securing the luggage piece 12 in place.

The dolly 14 includes a base 24, a pair of axially disposed wheels 26 being rotatably mounted to the base 24 on a wheel axis 27 for rollably supporting the luggage piece 12 and the dolly 14 on the roadway surface. A dolly handle 28 is connected by a handle frame 30 to the base for manipulation of the dolly 14, the frame 30 including a parallel spaced pair of telescoping column assemblies 32, each column assembly 32 having a first column member 34A, a second column member 34B, and a third column member 34C (being sometimes collectively referred to as 34), the first column members 34A being rigidly connected to the base 24 perpendicular to the wheel axis 27 and in proximate alignment therewith, the third (last) column members 34C being rigidly connected to opposite sides of the dolly handle 28 for permitting the dolly handle 28 to be positioned in respective extended and retracted positions relative to the base 24. In each column assembly 32, a first bushing 36A fixedly extends within the first column member 34A for axially guiding the second column member 34B, and a second bushing 34B fixedly extends within the second column member 34B for axially guiding the third column member 34C. Preferably, the column members 34 (and the bushings 36) are non-circularly cylindrical for preventing relative rotation of the column members 34 of each column assembly 32, thereby stiffening the handle frame 30 against twisting. The handle frame 30 is also provided with button latches 38 or other suitable means for selectively holding the columns 32 in the extended position.

An important feature of the present invention is that the dolly 14 is equipped with at least one luggage latch unit 40, respective first and second latch units 40A and 40B being shown in the drawings, for selectively coupling the latch channel member 20 of luggage pieces 12 that may be loaded onto the dolly 14, whereby the pieces 12 are securely held in place on the dolly 14 during transport thereof. The first latch unit 40A extends between the first column members 34A, having axial engagement therewith for selectively spacing the unit 40A relative to the base 24 for engagement with the latch channel member 20 as further described below. Similarly, the second luggage latch unit 40B extends between the second column members 34B, the first latch unit being located between the second latch unit and the base.

Figure 3:
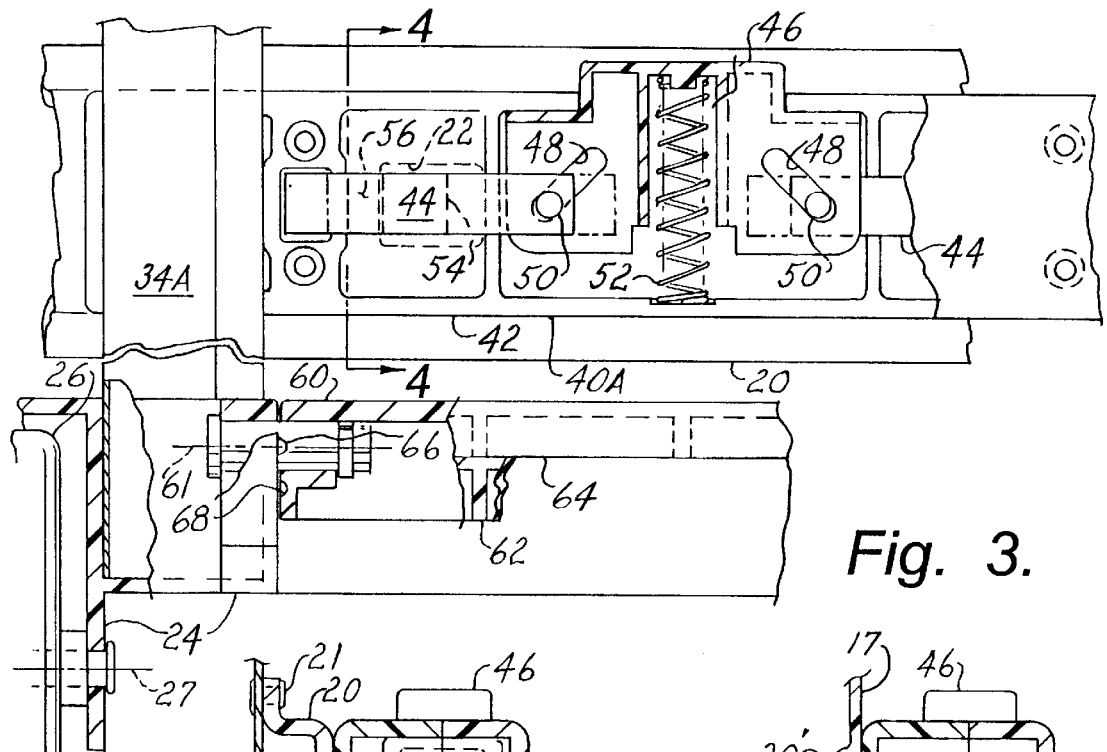
FIG. 3 is a fragmentary sectional elevational view of the system portion of FIG. 2.
Figure 4:
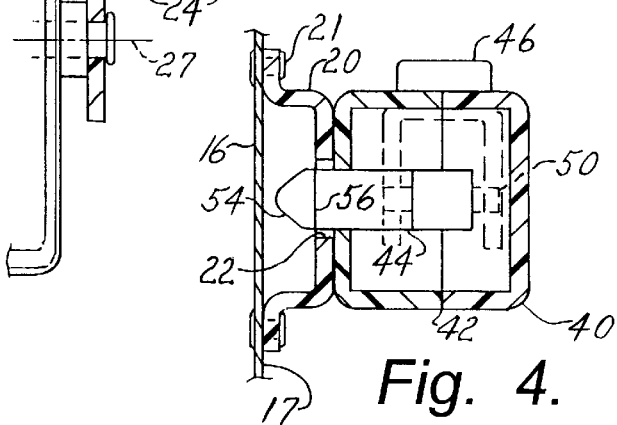
FIG. 4 is a side elevational sectional detail view of the system of FIG. 1 on line 4—4 in FIG. 3.

Each latch unit 40 includes a latch frame 42 that engages the corresponding column members 34, a pair of latch members 44 being slidably supported in the frame 42 for movement between respective latching and unlatching positions, the latching position being depicted by solid lines in the drawings, the unlatching position by broken lines in FIGS. 2 and 3. A latch button 46 is slidably supported within the latch frame 42 between the latch members 44 and having respective ramp slots 48 formed thereon for slidably engaging corresponding boss portions 50 of each latch member 44 to effect complementary movement thereof between the latched and unlatched positions in response to movement of the latch button 46, a latch spring 52 being interposed between the button 46 and the frame 42 for biasing the latch members 44 to the latched position.

In the unlatching position, respective hook portions 54 the latch members 44 are insertable through corresponding ones of the latch plate openings 22 that are formed in the latch channel member 20, the insertion being facilitated by smoothly sloping contours that are formed on the hook portions 54 for guiding the luggage latch unit 40 into coupling engagement with the channel member 20. With the channel member 20 resting against the latch frame 42 and the latch button 46 being released, the latch spring 52 is effective for moving the latch members 44 to the latching position, respective hook shoulders 56 that are formed on the hook portions 54 of the latch members 44 engaging corresponding catch surfaces 58 of the channel member 20 opposite the frame 42, thereby securing the latch channel member 20 to the luggage connector unit 40. When the latch members 44 are held in the releasing position by depressing the latch button 46, the hook portions 54 of the latch members 44 can freely enter and exit the latch plate openings 22. As further shown in FIG. 2, the latch units 40A and 40B each have an alignment boss 59 that fixedly projects from the latch frame 42 into a centrally located pilot opening 23 of the channel member 20. The combination of the boss 59 and pilot opening 23 prevents the latch members 44 from being displaced from the latching position thereof in case of lateral loading from the container 16, such as might otherwise occur when the dolly 14 is being moved over uneven surfaces. Also, the boss 59 further facilitates engagement of the latch members 44 with the latch plate opening 22 by maintaining alignment of the latch unit 40 with the channel member 22 during the engagement. It will be understood that the positions of the channel member 20 and the latch unit 40 can be reversed within the scope of the present invention, there being respective latch units on the luggage piece 12 and the dolly 14 that are selectively coupleable for fixably holding the piece 12 in place on the dolly 14.

As further shown in the drawings, a platform member 60 is pivotally mounted to the base 24 on a platform axis 61, the platform axis 61 being located parallel to the wheel axis 27 proximate the handle frame 30. The platform member 60 is movable from an extended position that is generally perpendicular to the frame 30 as shown in FIGS. 1 and 3, to a retracted position that is generally parallel to and proximate the frame 30 as shown in FIGS. 6 and 7. In the extended position, the platform member 60 is adapted for supporting the luggage piece 12, a tab portion 62 of the member 60 extending between the columns 32 of the handle frame 30 and engaging a stop surface 64 of the base 24 for preventing movement of the platform member 60 beyond the extended position. At each side of the platform member 60, the base 24 has a detent button 66 for engaging a pair of detent cavities 68 that are formed in the platform member 60 in angularly spaced relation about the platform axis 61 for releasably holding the platform member 60 in each of the extended and folded positions thereof.

A pair of leg members 70 are mounted to the platform member 60 in spaced relation to the platform axis 61 for supporting the dolly 14 in a rest position as shown in FIG. 1 with the leg members 70 and the wheels 26 contacting the roadway surface 15, the platform member 60 being supported parallel to the roadway surface 15. Preferably the leg members 70 are pivotally mounted, being movable between an extended position as shown in FIG. 1 for support of the platform member 60, and a retracted position as shown in FIGS. 6 and 7. The leg members 70 advantageously retract inside of the platform member 60, so that when the platform member 60 is in the folded position of FIGS. 6 and 7, the handle frame 30 also being in the retracted position thereof, the dolly 14 has a compact side profile that facilitates storage and transport of the dolly 14 separate from the luggage piece 14.

Each of the latch units 40 is adjustably positionable on the handle frame 30 relative to the extended position of the platform 60, for engagement with variously sized ones of the luggage pieces 12. In the exemplary configuration as shown in the drawings, a pair of holder arms 74 are pivotally mounted to each latch frame 42 for holding the respective latch units in place on the telescoping columns 32. More particularly, each of the holder arms 74 has a grip element 76 affixed thereto for contacting the associated column member 34, a handle portion 78 of the arm 74 extending in spaced relation to the frame 42 opposite the luggage piece 12 for releasing the grip element 76 from gripping contact with the column member 43, a compression spring 80 being interposed between the handle portion 78 and the frame 42 for biasing the grip element against the column member 34. Thus each latch unit 40 can be positioned as desired on the handle frame 30 while applying thumb pressure against the handle portions 78 of the holder arms 74. The grip elements 76 can be made from a smooth material having a high friction coefficient, a suitable material being adhesive strip foam padding that is commercially available from a variety of sources.

It is contemplated that the latch unit 40A will be located on the column members 34A exclusively, or on the column members 34A and 34B. Thus the holder arms 74 of the latch unit 40A are operative for gripping the column members 34A and 34B in cooperation with a foam pad 82 that is affixed within the frame 42 opposite the grip elements 76, depending on the location of the latch unit 40A on the handle frame 30. Similarly, the latch unit 40B is locatable on the column members 24B and 34C, the holder arms 74 of the latch unit 40B being formed for holding the grip elements 76 thereof against the column members 34B or 34B in cooperation with a counterpart of the foam pad 82.

Figure 5:
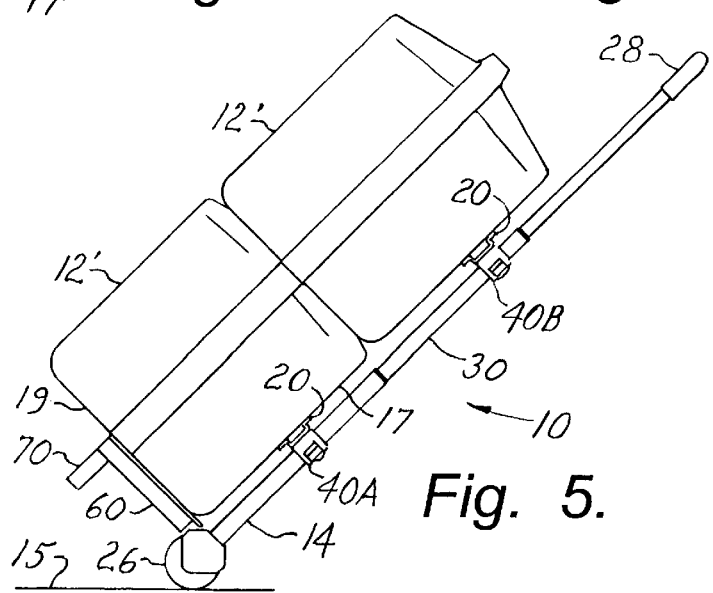
FIG. 5 is a side elevational view showing an alternative configuration of the system of FIG. 1, the dolly being in a transporting position.

As shown in FIG. 5, the dolly 14 can be loaded with a stacked plurality of luggage pieces, designated 12', that are counterparts of the luggage piece 12 of FIG. 1. Each of the luggage pieces 12' is provided with a single one of the latch channel members 20 for coupling with corresponding ones of the luggage latch units 40 of the dolly 14, the latch units 40 being each adjustably positionable relative to the platform member 60 for mating engagement with the respective channel members 20. It will be understood that the luggage pieces 12' can be variously sized, together and/or individually, by virtue of the adjustable positioning of each luggage latch unit 40 relative to the platform member 60. Also, the containers 16 of the luggage pieces 12 and 12' can be rigid and/or soft-sided. In FIG. 5, the dolly 14 is in a transport position that is inclined relative to the rest position of FIG. 1, the luggage pieces 12' being supported partly by the platform member 60 and partly by the latch frames 42 of the luggage latch units 40. In the case of luggage having flexible (cloth) counterparts of the container 16, support of the pieces 12 and/or 12' can be augmented by the handle frame 30 and/or the latch frames 42 directly contacting the containers 16 in the transport position of the dolly 14.

Suitable materials for the column members 34 include extruded aluminum alloy tubing. A suitable material for the wheels 26 is molded Neoprene®. Suitable materials for the latch channel member 20, the base 24, the dolly handle 28, the latch frames 42, the latch members 44, the platform member 60, and the leg members 70, are molded engineering plastics including polyethylene and polyurethane.

Figure 8:
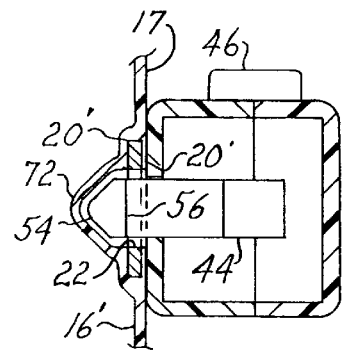
FIG. 8 is a sectional detail view as in FIG. 4, showing an alternative configuration of the system portion of FIG. 2.

With further reference to FIG. 8, an alternative configuration of the luggage piece 12 has a counterpart of the container, designated 16', having a latch plate 20' embedded therein in place of the latch channel member 20, the container 16' having an inwardly projecting dimple 72 formed therein for receiving the hook portion 54 of the latch member 44, the dimple 72 covering the latch plate opening 22.

The luggage system 10 of the present invention provides a convenient and secure way to transport luggage, that is not wasteful of space, and is easy to use as well as inexpensive to provide. It is versatile in that the dolly 14 can transport a single large luggage piece 12 utilizing a spaced pair of coupled latch units 40 for enhanced security, as well as a stacked plurality of luggage pieces 12' in a variety of sizes, shapes, and construction, each of the pieces 12' being secured in place with a corresponding coupled latch unit 40. The luggage pieces 12' in various sizes are securable to the dolly 14 while being supported on the platform member 60 because the latch units 40 are adjustably spaced above the platform member 60.

Figures 9, 10, 11:
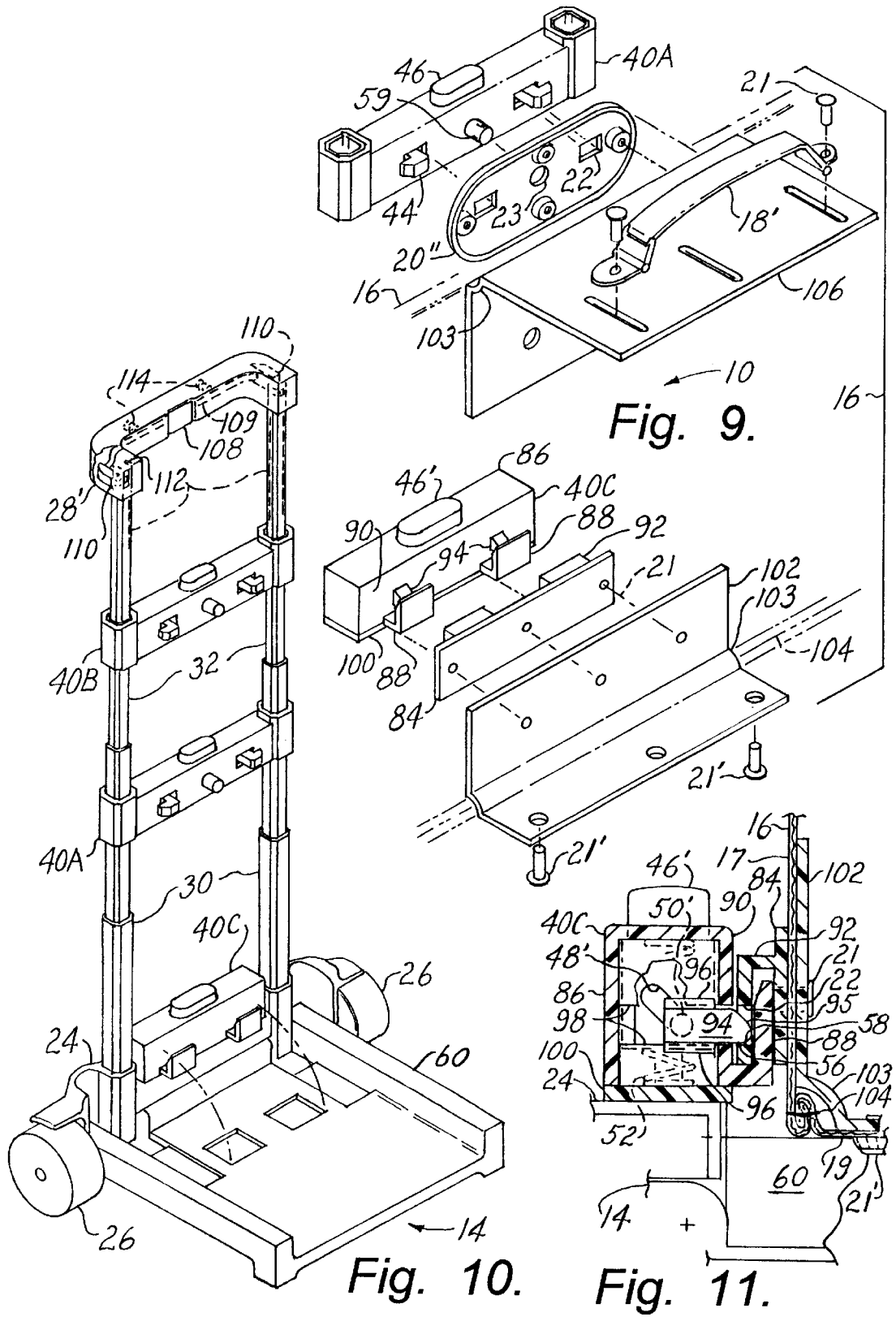
FIG. 9 is an exploded perspective view showing another alternative configuration of the system of FIG. 1.
FIG. 10 is a perspective view of a dolly portion of the system of FIG. 9.
FIG. 11 is a detail fragmentary sectional view showing a lower latch portion of the system of FIG. 9.

With further reference to FIGS. 9–11, an alternative configuration of the luggage system 10 includes a bottom or base latch unit 40C that is fixedly located on the base 24 of the dolly 14, and a bottom latch plate 84 that is fixedly located on the side face 17 proximate a bottom face 19 of at least some of the containers 16. The base latch unit 40C includes a housing 86 having a pair of hook portions 88 projecting upwardly in spaced relation to a main portion 90 thereof for engaging the bottom latch plate 84 with a bottom portion of the container 16 in centered registration relative to the base 24 of the dolly 14. Accordingly, the latch plate 84 is formed with a pair of cavity portions 92 into which the hook portions 88 upwardly project. Thus loading of the container 16 onto the dolly 14 is facilitated by permitting the latch plate 84 to be engaged by the hook portions 88 as the container 16 is being lowered onto the platform member 60 of the dolly 14. Preferably the base latch unit 40C further includes a latch member 94 that movably projects into a latch plate opening 22 of the latch plate 84, thereby securing the latch plate 84 in engagement with the base latch unit 40C. More particularly, the cavity portions 92 are each formed with respective openings 22, each opening 22 providing a counterpart of the catch surface 58 that is engaged by a counterpart of the hook shoulder 56 on the latch member 94. Although it is contemplated that there be a laterally spaced pairs of hook portions 88, cavity portions 92, latch members 94, and plate openings 22 in the configuration of FIGS. 9–11, it will be understood that one of each is also within the scope of the present invention.

The base latch unit 40C also includes a counterpart of the latch button, designated 46', having counterparts of the ramp slots, designated 48', that are oriented for engaging respective laterally projecting counterparts of the boss portions, designated 50', of the latch members 94. Thus the latch members 94 are retracted into the main portion 90 of the housing 88 in response to depression of the button member 46', being moved outwardly proximate the hook portions 88 by a counterpart of the latch spring 52 that biasingly raises the button member 46'. Preferably, the latch members 94 have rounded contours as indicated at 95 for permitting automatic retraction thereof against resistance from the latch spring 52 as the latch plate 84 is lowered onto the hook portions 88.

As further shown in FIG. 11, each of the latch members 94 has a pair of blade portions 96 that slidingly project between respective partition portions 98 of the housing 86 for maintaining alignment of the latch members 94 during movement thereof. Upper ones of the partition portions are formed in the main portion 90 of the housing 86, corresponding lower ones of the partition portions 98 being formed on a removable housing plate 100 of the housing 86, the latch spring 52 being supported on the housing plate 100.

The bottom latch plate 84 is fastened to the container 16 by counterparts of the fastener 21, the container 16 being reinforced threat by an angle member 102 through which the fasteners 21 are anchored. Additional counterparts of the fasteners, designated button fasteners 21', connect the angle member 102 to a bottom portion of the container 16. Thus the latch plate 84 is rigidly supported on the container 16, even when the container 16 is formed mainly of flexible materials such as cloth fabric. The Angle member is formed having a bridge portion 103 thereof for clearing a fabric seam 104 of the container 16 as best shown in FIG. 11.

As further shown in FIG. 9, a molded counterpart of the latch channel member, designated 20'', is similarly connected to an upper portion of the container 16 by further counterparts of the fasteners 21, being reinforced by an additional angle plate 106, the angle plate also providing a rigid connection to a counterpart of the luggage handle, designated 18'.

As further shown in FIG. 10, a counterpart of the dolly handle, designated 28', supports a release button 108 that is mechanically coupled by a release bar 109 to a pair of release cams 110 that engage a pair of release rods 112, the rods 112 extending within respective ones of the telescoping columns 32 for releasing counterparts of the button latches 38 (not shown). A pair of button springs 114 are located within the handle 28' for biasingly holding the release button 108 in an outwardly displaced inactive position wherein the release rods 112 do not inhibit operation of the button latches 38.

The luggage system of the present invention is particularly suitable for specialty containers such as golf bags as well as conventional luggage, in both hard and soft configurations thereof.

Although the present invention has been described in considerable detail with reference to certain preferred versions thereof, other versions are possible. For example, the latch channel member(s) can be located on bottom surfaces of the luggage pieces 12 alternatively or in addition to on side and end surfaces thereof. Also, the luggage latch units 40 can be configured with only one movable latch member 44 that works in conjunction with a stationary member, the stationary member being either adjacent to or spaced from the movable latch member. Further, in place of the holder arms 74, the grip elements 76 (or detent elements) can be provided on outwardly projecting slide portions of the latch member 44, the grip elements being released in the unlatching position of the latch members 44. Moreover, the latch units can incorporate magnetic elements. Alternatively, the holder arms 74 can be substituted by counterparts of the foam pad 82 compressively engaging the column members 34 within the latch frames 42. The present invention is not restricted regarding the number of latch units 40, one, two (as shown in the drawings), three, or even four of the latch units 40 being specifically contemplated. For example, it is preferred that medium and larger sized luggage have a pair of the latch channel members 20 or equivalents thereof, the dolly 12 equipped with three of the luggage latch units being utilized for engaging one luggage piece 12 having two of the channel members 20 stacked with one smaller piece having only one of the channel members 20; and two pieces 12 of medium size would engage four of the luggage latch units 40. Therefore, the spirit and scope of the appended claims should not necessarily be limited to the description of the preferred versions contained herein.

What is claimed is:

1. A luggage system comprising a luggage piece having side and bottom faces and a bottom dolly connector unit fixably located on the side face proximate the bottom face, the bottom dolly connector unit including a cavity portion having a bottom opening, the bottom dolly connector unit also having a catch surface; and a dolly, the dolly comprising:
  (a) a movable base, a platform fixably located relative to the base;
  (b) a handle member fixably locatable relative to the base for manipulation thereof;
  (c) a base luggage connector unit supported on the base proximate the platform, comprising an upwardly projecting hook portion for engaging the cavity portion of the bottom dolly connector unit, and a movable latch member for engaging the catch surface, the base luggage connector unit being selectively coupleable with the bottom dolly connector unit for fixably registering the luggage piece on the dolly whereby the luggage piece is rigidly retained on the dolly.

2. A luggage system comprising:
  (a) a luggage piece having side and bottom faces, a bottom dolly connector unit fixably located on the side face proximate the bottom face, and an elevated dolly connector unit located on the side face in spaced relation above the bottom dolly connector, the elevated dolly connector unit including a rigid latch plate member having a latch plate opening therein; and
  (b) a dolly, the dolly comprising:
    (i) a movable base, a platform fixably located relative to the base;
    (ii) a handle member fixably locatable relative to the base for manipulation thereof;
    (iii) a base luggage connector unit supported on the base proximate the platform, the base luggage connector unit being selectively coupleable with the bottom dolly connector unit; and
    (iv) an elevated luggage connector unit having an elevated latch member, at least a portion of the elevated latch member being insertable into the latch plate opening during coupling of the elevated connector units for fixably registering the luggage piece on the dolly.

3. The luggage system of claim 2, wherein the elevated luggage connector unit comprises a latch frame member connected to the base in spaced relation between the platform and the handle member, the elevated latch member being connected to the latch frame member and movable between open and closed positions relative to the latch frame member, the elevated latch member in the open position thereof being insertable into the latch plate opening during coupling of the connector units, the elevated latch member having a hook portion for holding the latch plate member proximate the latch frame member in the closed position of the elevated latch member.

4. The luggage system of claim 3, wherein the latch member is one of an oppositely disposed pair of elevated latch members, the system further comprising a registration boss fixedly located on one of the elevated connector units, the other of the elevated connector units having a registration opening formed therein for engagement by the registration boss, for guiding the elevated latch members into engagement with the elevated latch plate.

5. The luggage system of claim 4, wherein the luggage latch unit further comprises a latch actuator member movably supported by the latch frame member for simultaneous movement of the elevated latch members between the open and closed positions thereof, and a biasing element for biasing the elevated latch members toward the closed positions thereof.

6. A luggage system comprising a luggage piece having side and bottom faces and a bottom dolly connector unit fixably located on the side face proximate the bottom face; and a dolly, the dolly comprising:
  (a) a movable base, a platform fixably located relative to the base;
  (b) a handle member fixably locatable relative to the base for manipulation thereof;
  (c) a base luggage connector unit supported on the base proximate the platform, the base luggage connector unit being selectively coupleable with the bottom dolly connector unit for fixably registering the luggage piece on the dolly;
  (d) a pair of axially spaced wheels rotatably mounted relative to the base for rolling the dolly over a roadway surface;
  (e) a handle frame connected between the base and the handle, the base luggage connector unit being connected to the handle frame; and
  (f) a support member fixably locatable relative to the base, the dolly having a rest position wherein the platform is disposed in fixed relation parallel to the roadway surface with the wheels and the support member contacting the roadway surface, the handle frame extending perpendicular to the platform, the dolly also having a transport position wherein the platform and the handle frame are together inclined relative to the rest position, the support member being raised from the roadway surface with the wheels rollably supporting the dolly, the luggage piece being supportable partly on the platform and partly by the handle frame when the connector units are coupled together.

7. The luggage system of claim 6, wherein the platform is pivotally connected to the base on a platform axis, the platform axis being located proximate the handle frame, the platform being movable between an extended position perpendicular to the handle frame and a retracted position approximately parallel to the handle frame, the support member being connected to the platform in spaced relation to the platform axis, the platform being in the extended position in the rest and transport positions of the dolly.

8. The luggage system of claim 6, wherein the luggage piece further comprises an elevated dolly connector unit located in spaced relation above the bottom dolly connector unit and the dolly further comprises an elevated luggage connector unit.

9. The luggage system of claim 8, wherein the handle frame comprises a plurality of telescoping members for selectively locating the handle member between an extended position and a retracted position relative to the base, the telescoping members forming a parallel spaced pair of frame columns, the elevated luggage connector unit being connected between corresponding members of each column.

10. The luggage system of claim 9, wherein the elevated luggage connector unit is a first elevated luggage connector and the members are first column members, the dolly further comprising a second elevated luggage connector, the second elevated luggage connector being connected between respective second column members of each column.

11. The luggage system of claim 10, wherein the luggage piece is a first luggage piece, the system further comprising a second luggage piece having a counterpart of the elevated dolly connector unit of the first luggage piece, the luggage pieces being stackable on the platform. with respective ones of the elevated dolly connector units releasably engaging the first and second elevated luggage connectors.

12. The luggage system of claim 9, when the luggage piece is a selected one of a plurality of luggaqe pieces, at least some of the pieces having the elevated dolly connector unit differently spaced from the bottom face, the elevated luggage connector unit being adjustably locatable relative to the platform for alignment with the elevated dolly connector unit of the selected luggage piece.

13. The luggage system of claim 12, further comprising a latch holder for yieldably holding the elevated luggage connector unit on at least one of the column members.

14. A luggage dolly for a plurality of luggage pieces, each luggage piece having a bottom dolly connector fixably located on a face surface proximate a bottom surface thereof, the bottom dolly connector having a cavity portion, the dolly comprising:
   (a) a base having an axially spaced pair of wheels rotatably mounted thereto for engaging a roadway surface;
   (b) a handle frame projecting from the base and including a parallel-spaced pair of column members;
   (c) a platform connected to the base for extending therefrom approximately perpendicular to the handle frame while supporting a luggage piece, the platform having a support member for contacting the roadway surface in a rest position of the dolly wherein the platform is disposed in fixed relation parallel to the roadway surface with the wheels also contacting the roadway surface, the dolly also having a transport position wherein the platform and the handle frame are together inclined relative to the rest position with the support member raised from the roadway surface and the wheels rollably supporting the dolly; and
   (d) a base luggage connector unit supported on the base proximate the platform and between the columns of the handle frame for engaging the bottom dolly connectors of the luggage pieces, the base luggage connector unit comprising:
      (i) a housing having a hook portion projecting therefrom for engaging the cavity portion of the bottom dolly connector, at least one luggage piece being supportable partly on the platform and partly by the handle frame when the hook portion is engaging the cavity portion;
      (ii) a base latch member supported by the housing and movable between respective latching and releasing positions, the base latch member having an engagement shoulder, the engagement shoulder being operative for securing the bottom dolly connector of a luggage piece on the hook portion of the housing in the latching position of the base latch member; and
      (iii) a base latch actuator for moving the base latch member between the latching and releasing positions, the latch member being formed for freely permitting entry and exit of the hook portion of the housing relative to the cavity portion of the, bottom dolly connector in the releasing position of the base latch member.

15. The luggage dolly of claim 14, for at least some of the luggage pieces having an elevated dolly connector located in spaced relation above the bottom dolly connector, the dolly further comprising:
   (a) an elevated luggage connector unit supported on the handle frame for engaging the elevated dolly connectors of the luggage pieces, the elevated luggage connector unit comprising:
      (i) an elevated latch frame member, at least one luggage piece being supportable partly on the platform and partly by the handle frame when the elevated connector units are coupled together;
      (ii) an elevated latch member supported by the latch frame member and movable between respective latching and releasing positions, the elevated latch member having an engagement shoulder, the engagement shoulder being operative for securing the elevated dolly connector of a luggage piece against the latch frame member in the latching position of the elevated latch member; and
      (iii) an elevated latch actuator for moving the elevated latch member between the latching and releasing positions, the elevated latch member being formed for freely entering and exiting the elevated dolly connector in the releasing position of the elevated latch member.

16. A luggage piece for a system including a dolly for transporting luggage pieces and having a movable base, a handle frame fixably extending from the base for manipulation thereof, a platform connected to the base and extendable approximately perpendicular to the handle frame, a base luggage connector unit fixably located on the base proximate the handle frame and including a protecting hook portion and a movable latch member, the luggage piece comprising: a container having side and bottom faces, a bottom dolly connector unit fixably located on the side face proximate the bottom face for selectively coupling with the base luggage connector unit when the side face is against the handle frame and the bottom face is against the platform, the bottom dolly connector unit having a cavity portion for receiving at least a portion of the protecting hook portion, the bottom dolly connector unit being formed having a catch surface for engagement by the latch member whereby the luggage piece is rigidly retained in fixed registration on the dolly.

17. The luggage piece of claim 14, wherein the bottom dolly connector unit includes a latch plate member having a latch plate opening for receiving the latch member, the latch plate member being mounted with the latch plate opening in spaced relation to an outside surface of the luggage piece.

18. A luggage system comprising a luggage piece having side and bottom faces and a dolly connector structure fixably located on the side face, the dolly connector structure including a cavity portion having a bottom opening, the dolly connector structure also including a latch plate having a catch surface; and a dolly, the dolly comprising:
   (a) a movable base;
   (b) a handle frame rigidly extending from the base for manipulation thereof;
   (c) a luggage connector structure, comprising an upwardly projecting hook member on the base for engaging the cavity portion of the dolly connector structure, a latch frame connected to one of the base and the handle frame, a latch member being movably supported by the latch frame for engaging the catch surface, the luggage connector structure being selectively coupleable with the dolly connector structure with the hook member engaging the cavity, the latch frame contacting the latch plate, and the latch member engaging the catch surface for fixably registering the luggage piece on the dolly whereby the luggage piece is rigidly retained on the dolly.

19. The luggage piece of claim 18, wherein the latch plate member has a latch plate opening for receiving the latch member, the system further comprising a registration boss fixedly located on one of the latch plate and the latch frame, the other of the latch plate and the latch frame having a registration opening formed therein for engagement by the registration boss, for guiding the latch member into engagement with the latch plate member.

20. The luggage piece of claim 18, wherein the dolly further comprises a pair of axially spaced wheels rotatably mounted relative to the base for rolling the dolly over a roadway surface.

* * * * *